United States Patent [19]

Tamura et al.

[11] Patent Number: 4,587,554
[45] Date of Patent: May 6, 1986

[54] CRT DRIVE CONTROL CIRCUIT

[75] Inventors: Takahiko Tamura, Tokyo; Masaharu Tokuhara, Kanagawa, both of Japan

[73] Assignee: Sony Corporation, Tokyo, Japan

[21] Appl. No.: 642,439

[22] Filed: Aug. 20, 1984

[30] Foreign Application Priority Data

Aug. 22, 1983 [JP] Japan .................... 58-152923

[51] Int. Cl.$^4$ .......... H04N 9/16; H04N 5/68; H04N 5/235; H04N 5/57
[52] U.S. Cl. ............... 358/74; 358/243; 358/168; 358/169
[58] Field of Search ............. 358/243, 74, 168, 169

[56] References Cited

U.S. PATENT DOCUMENTS 4,081,838  3/1978  Wheeler ............... 358/169
4,137,552  1/1979  Serafini ............... 358/243

Primary Examiner—Michael A. Masinick
Assistant Examiner—E. Anne Toth
Attorney, Agent, or Firm—Hill, Van Santen, Steadman & Simpson

[57] ABSTRACT

A CRT drive control circuit for automatically limiting beam current when it is too large. A brightness reduction control and a contrast reduction control are alternately applied in accordance with a dark level detection of a video signal.

6 Claims, 4 Drawing Figures

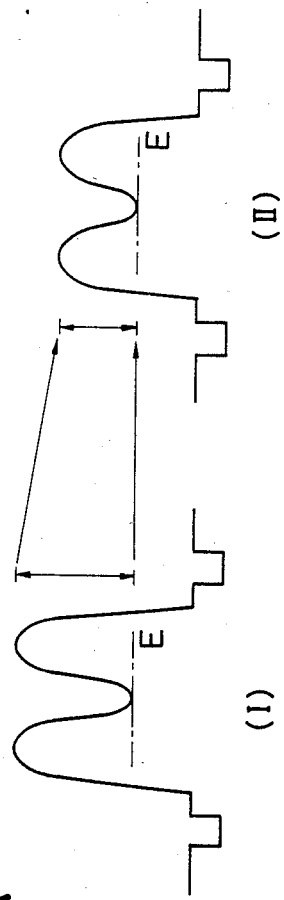
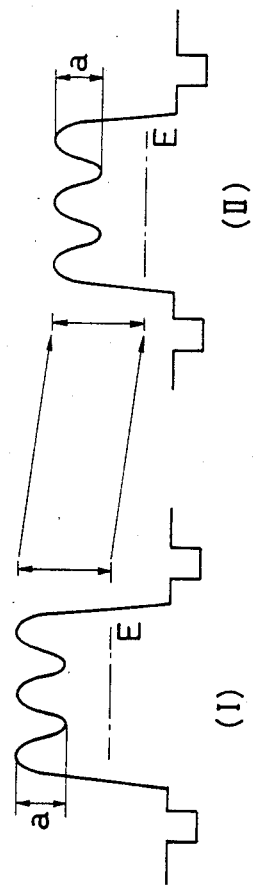
FIG.2A
FIG.2B

CRT DRIVE CONTROL CIRCUIT

BACKGROUND OF THE INVENTION

The present invention relates to a CRT (cathode-ray tube) drive control circuit for controlling a beam current.

An ABL (automatic beam limiter) is arranged in a conventional TV receiver to limit a beam current flowing in the CRT to a predetermined level. A brightness-ABL and a contrast-ABL (or picture-ABL) are known as conventional ABL circuits. The brightness-ABL detects an average beam current of the CRT and decreases a brightness level when a detected beam current level is high. The contrast-ABL decreases a contrast level when a level of an average beam current of the CRT is high.

When the brightness-ABL is operated, an image near dark level becomes black and thus the resolution of the image is degraded. In addition to this disadvantage, changes of a ratio of luminance to chroma often renders a dark flesh tone. On the other hand, in the contrast-ABL, there is neither a deterioration of dark resolution nor a change of a ratio of luminance to chroma. However, in an image having a large average beam current, image contrast becomes insufficient, and a low-quality image results.

SUMMARY OF THE INVENTION

It is an object of the present invention to provide a CRT drive control circuit which eliminates deterioration of dark resolution and changes in a ratio of luminance to chroma, and which maintains a high contrast.

In order to achieve the above object of the present invention, there is provided a CRT drive control circuit for detecting a beam current of a CRT and decreasing a luminance or contrast level when a detected current is large. A detector is provided for detecting a black level of a video signal, and a switching control circuit is provided for changing a ratio of a reduction control in brightness to a reduction control in contrast in response to a detected black level. With this circuit arrangement, beam current limitation can be performed without a deterioration of dark resolution and a decrease in contrast.

BRIEF DESCRIPTION OF THE DRAWINGS

FIGS. 2A and 2B are waveform charts of video signals for explaining the beam current limiting operation of the limiter of FIG. 1.

DETAILED DESCRIPTION OF THE PREFERRED EMBODIMENTS

The present invention will be described in detail with reference to a preferred embodiment taken in conjunction with the accompanying drawings.

Figure 1:
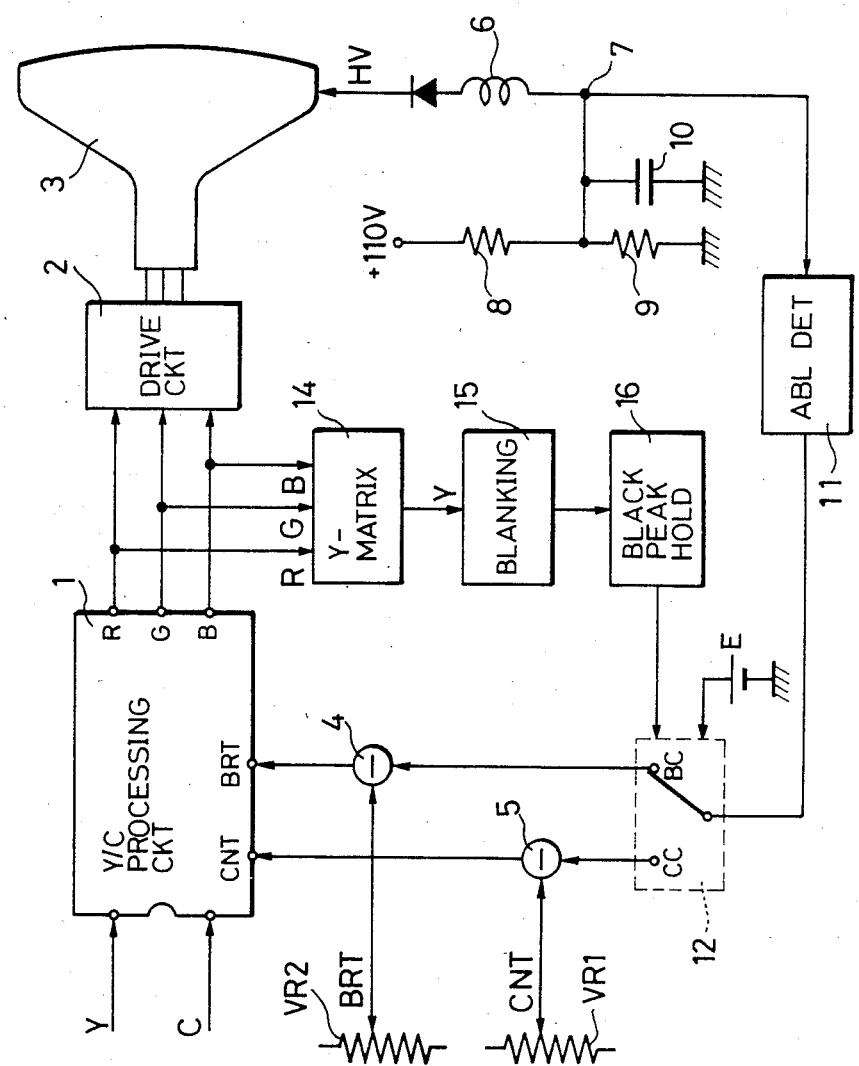
FIG. 1 is a block diagram showing a main portion of a TV receiver which employs a beam current limiter as a CRT drive control circuit according to an embodiment of the present invention.

FIG. 1 is a block diagram showing the main part of a TV receiver which employs a beam current limiter as a CRT drive control circuit according to an embodiment of the present invention. After tuning, IF processing and detection are performed, a resultant video signal (luminance signal Y and chrominance signals C) is processed by a Y/C processing circuit 1. The processing circuit 1 supplies R, G and B outputs to a CRT 3 through a drive circuit 2. The processing circuit 1 has a brightness control terminal BRT and a contrast control terminal CNT. The terminals BRT and CNT receive through subtractors 4 and 5 control signals from amplitude controls VR1 and VR2 which are variably controlled.

An average beam current of the CRT 3 can be detected in accordance with a voltage level at a terminal (ABL terminal) 7 of a flyback transformer 6 which supplies a high voltage to the anode of the CRT 3. The ABL terminal 7 is connected to a DC power supply terminal of +110 V through a resistor 8 and to a horizontal drive circuit (not shown). A current corresponding to the beam current flows from the power supply terminal to the anode of the CRT 3 through the resistor 8 and the flyback transformer 6. A voltage-dividing resistor 9 and a smoothing capacitor 10 are connected between the terminal 7 and ground so as to detect the average level of the beam current.

A voltage appearing at the terminal 7 is applied to an ABL level detector 11. When a beam current above a predetermined level is detected, a control output is generated by the detector 11. The control output is switched at an ABL switching circuit 12, and supplied to the brightness control terminal BRT and the contrast control terminal CNT through the subtractors 4 and 5, respectively. When a detected beam current is large, brightness or contrast level is decreased.

The ABL switching circuit 12 is controlled in response to a level of the black peak of the video signal. More particularly, the R, G and B outputs from the processing circuit 1 are supplied to a Y matrix circuit 14 which then generates the luminance signal Y. If color difference signals and the luminance signal are generated at the processing circuit 1, the Y matrix circuit 14 can be omitted. The luminance signal Y is supplied to a blanking circuit 15, and sync pulse components of the luminance signal Y are removed at the blanking circuit 15. A resultant luminance signal Y is supplied to a black peak hold circuit 16. The black peak hold circuit 16 generates a level signal corresponding to the black peak in response to the signal from the blanking circuit 15. This black peak level signal is supplied to the ABL switch circuit 12 and is compared with a preset black level E.

When the black peak level is lower (i.e., black level side) than the preset black level, the ABL switching circuit 12 is connected to the contrast control contact CC so as to lower the contrast level. However, when the black peak level is higher (i.e., white level side) than the preset black level, the ABL switching circuit 12 is connected to the brightness control contact BC so as to lower the brightness level.

The ABL operation will now be described with reference to the waveforms of the video signals shown in FIGS. 2A and 2B. A waveform (I) of a video signal, as shown in FIG. 2A, is produced when the ABL operation is not performed. In this waveform, the black peak level reaches the preset black level E. As previously described, when the beam current increases from this state, the contrast ABL operation is performed to lower the contrast level, as shown in a waveform (II), by compressing the video level. As a result, the beam current can be limited without deteriorating the dark resolution. However, as shown in a waveform (I) of FIG.

2B, when the black peak level is above the preset black level, the brightness ABL operation becomes effective. As a result, the level of the video signal is lowered, as shown in a waveform (II) of FIG. 2B. An effective amplitude a of the video signal does not change by the operation of the ABL. Thus, the beam current is limited without deteriorating high contrast. In addition, the brightness ABL operation is started only when the black peak level is above the preset black level. Therefore, even if the ABL control lowers the luminance level, unlike the conventional circuit, the dark resolution will not be deteriorated.

Figure 3:
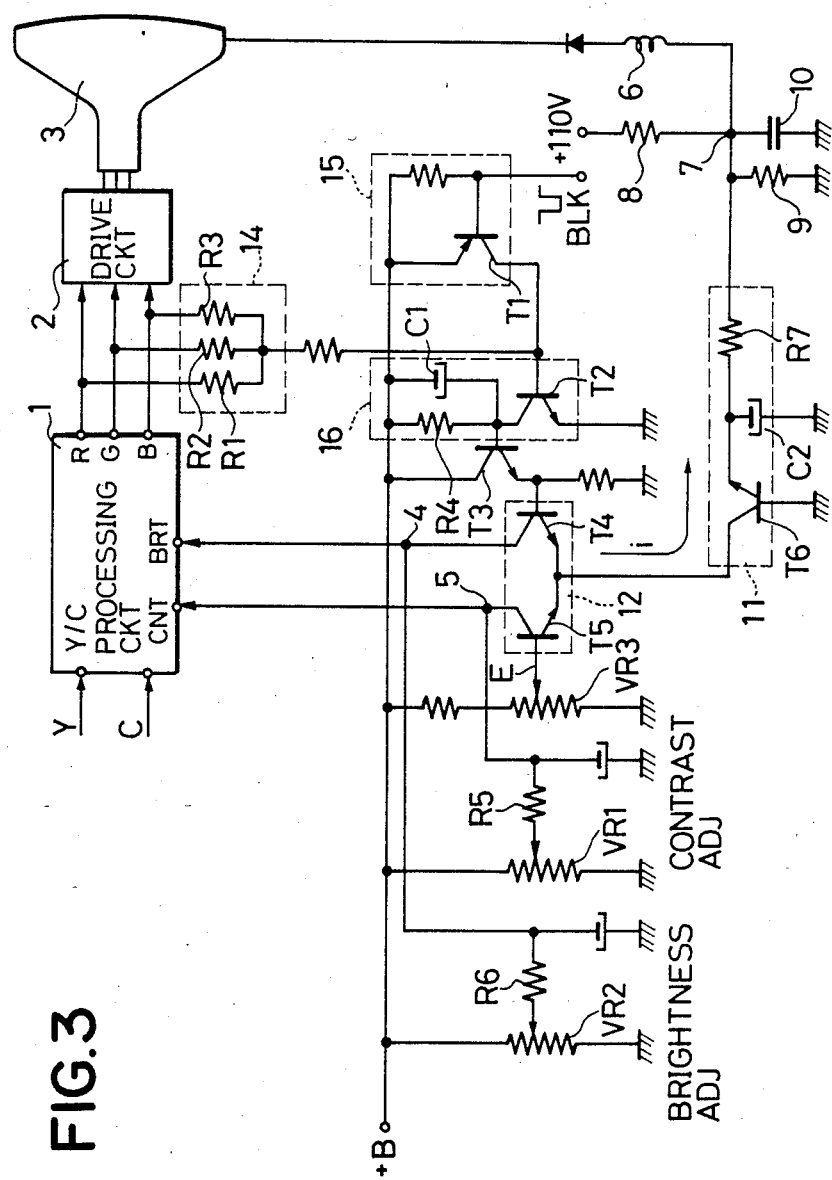
FIG. 3 is a circuit diagram of the beam current limiter shown in FIG. 1.

FIG. 3 is a circuit diagram of the circuit shown in FIG. 1. Referring to FIG. 3, a beam current detection signal appearing at the ABL terminal 7 of the flyback transformer 6 is supplied to the emitter of a transistor T6 through a ripple filter consisting of a resistor R7 and a capacitor C2. The base of the transistor T6 is grounded. When the beam current is increased to put the emitter of the transistor T6 at a voltage of −0.6 V or lower, the transistor T6 goes on and an ABL control current i starts to flow therethrough. The current i is divided into the brightness-ABL and contrast-ABL components by the ABL switching circuit 12 formed by a pair of emitter-coupled transistors T4 and T5.

On the other hand, the R, G and B outputs from the processing circuit 1 are combined at the Y matrix circuit 14 consisting of resistors R1, R2, and R4. The Y matrix circuit 14 generates the luminance signal Y. The sync pulse components of the luminance signal Y are removed at the blanking circuit 15, including a transistor T1 which receives a blanking pulse BLK. The luminance signal Y is supplied to the black peak hold circuit 16 consisting of a transistor T2, a resistor R4, and a capacitor C1. The black peak hold circuit 16 has a sufficiently small time constant when the capacitor C1 is charged in accordance with the change of the luminance level toward the dark level and a sufficiently large time constant when the capacitor C1 is discharged in accordance with the change of the luminance level toward the white level. The black peak detection signal is supplied to the base of the transistor T4 in the ABL switching circuit 12 through an emitter follower transistor T3. The transistor T5 in the switching circuit 12 receives the preset black level E obtained from a variable resistor VR3. The preset black level E is then compared with the detected peak level.

When the detected black peak level is higher than the preset black level, the transistor T4 is turned on, and the ABL control current i flows through the luminance adjustment volume VR2 and the transistor T4. A level at the subtractor 4 connected to the collector of the transistor T4 is lowered, so that a voltage at the brightness control terminal BRT is lowered. In this manner, the brightness ABL operation is started. On the other hand, when the detected black peak level is lower than the preset black level, the transistor T5 is turned on, and the ABL control current i flows through the contrast adjustment volume VR1 and the transistor T5. A level at the subtractor 5 connected to the collector of the transistor T5 is lowered to decrease the voltage at the contrast control terminal CNT, thereby starting the contrast ABL operation.

In the ABL switching circuit 12, one of the transistors T4 and T5 is turned on and the other is turned off. But there exists a transient state. More particularly, when the detected black peak level is sufficiently higher than the preset black peak level, only the transistor T4 is turned on to start the brightness ABL operation, as previously described. In this state, when the black peak level is gradually lowered, the transistor T4 is gradually turned off, while the transistor T5 is gradually turned on. Accordingly, the contrast ABL operation is started while the brightness ABL operation is effective. When the detected black peak level becomes below the preset black peak level, only the transistor T5 is completely turned on. In this state, only a contrast ABL control is performed. Therefore, when the black peak level of an image is so low as to cause deterioration of dark resolution in the brightness ABL mode, only the contrast ABL mode is set in practice to improve the resolution.

As has been described above, the ratio of a reduction control in brightness to a reduction control in contrast is determined in accordance with a detected black peak level of the video signal when a beam current of the CRT is large. For a video signal component including a low black peak level which causes the deterioration of dark resolution by the ABL with brightness control, the ABL is changed over to the contrast-ABL, thus preventing the deterioration of dark resolution. Furthermore, when the black level is sufficiently high, the beam current is limited with the brightness control mode, thus obtaining a high-contrast image.

Although various minor changes and modifications might be proposed by those skilled in the art, it will be understood that we wish to include within the claims of the patent warranted hereon all such changes and modifications as reasonably come within our contribution to the art.

We claim as our invention:

1. A CRT drive control circuit for beam current control in response to a level of a beam current of a CRT, comprising:
    signal processing circuit means for processing an incoming color video signal;
    CRT drive circuit means connected to an output of said signal processing circuitmeans for generating a drive signal to be supplied to said CRT;
    dark level detecting circuit means connected to said output of the signal processing circuit means for detecting a dark level;
    beam current detecting circuit means connected to said CRT to detect a level of beam current of the CRT; and
    feedback circuit means between the beam current detecting circuit means and said signal processing circuit means for controlling said CRT drive circuit means so as to control a video signal therein in response to a detected beam current, and wherein either contrast level or brightness level of the video signal is selectively controlled depending on a level of the detected beam current.

2. A CRT drive control circuit according to claim 1 wherein said feedback circuit means includes a switch circuit means which switches in dependence upon said detected dark level.

3. A CRT drive control circuit according to claim 2 wherein said beam current detecting circuit means generates a control signal when the beam current level of the CRT exceeds a predetermined amount.

4. A CRT drive control circuit according to claim 2 wherein said dark level detecting circuit means includes peak detector means for detecting a black peak of a signal obtained from said signal processing circuit means.

5. A CRT beam current control system, comprising:

signal processing circuit means for processing an incoming video signal and producing a drive video signal for a CRT;

beam current detecting means connected to determine a beam current level occurring in the CRT as a result of the drive video signals fed thereto;

dark level detecting circuit means connected to the signal processing circuit means for providing a control signal indicative of black level in the drive signal fed to the CRT; and feedback circuit means including a switching means for controlling either contrast level or brightness level in the signal processing circuit means selectively, depending on a level of the detected beam current.

6. A system according to claim 5 wherein the feedback circuit means compares a black level from said dark level detecting circuit means to a preset black level and, if the detected black level is higher than the preset black level, said switch means connects a control signal corresponding to the beam current level so as to control the brightness level in said signal processing circuit means, and when the detected black level is below the preset black level, a switch means connects the signal responsive to the beam current level to control contrast level in said signal processing circuit means.

* * * * *